Figure 3:
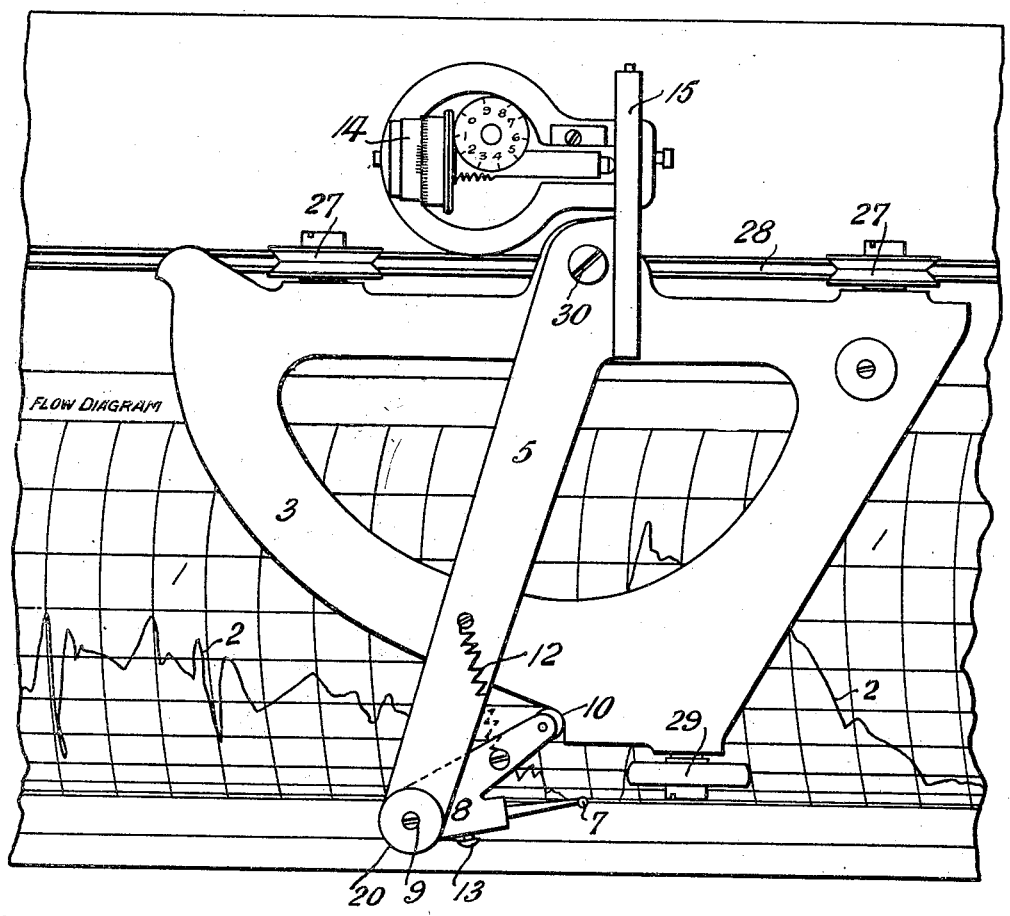

July 12, 1932.  H. E. DALL  1,867,441
PLANIMETER
Filed Nov. 1, 1930  3 Sheets-Sheet 1
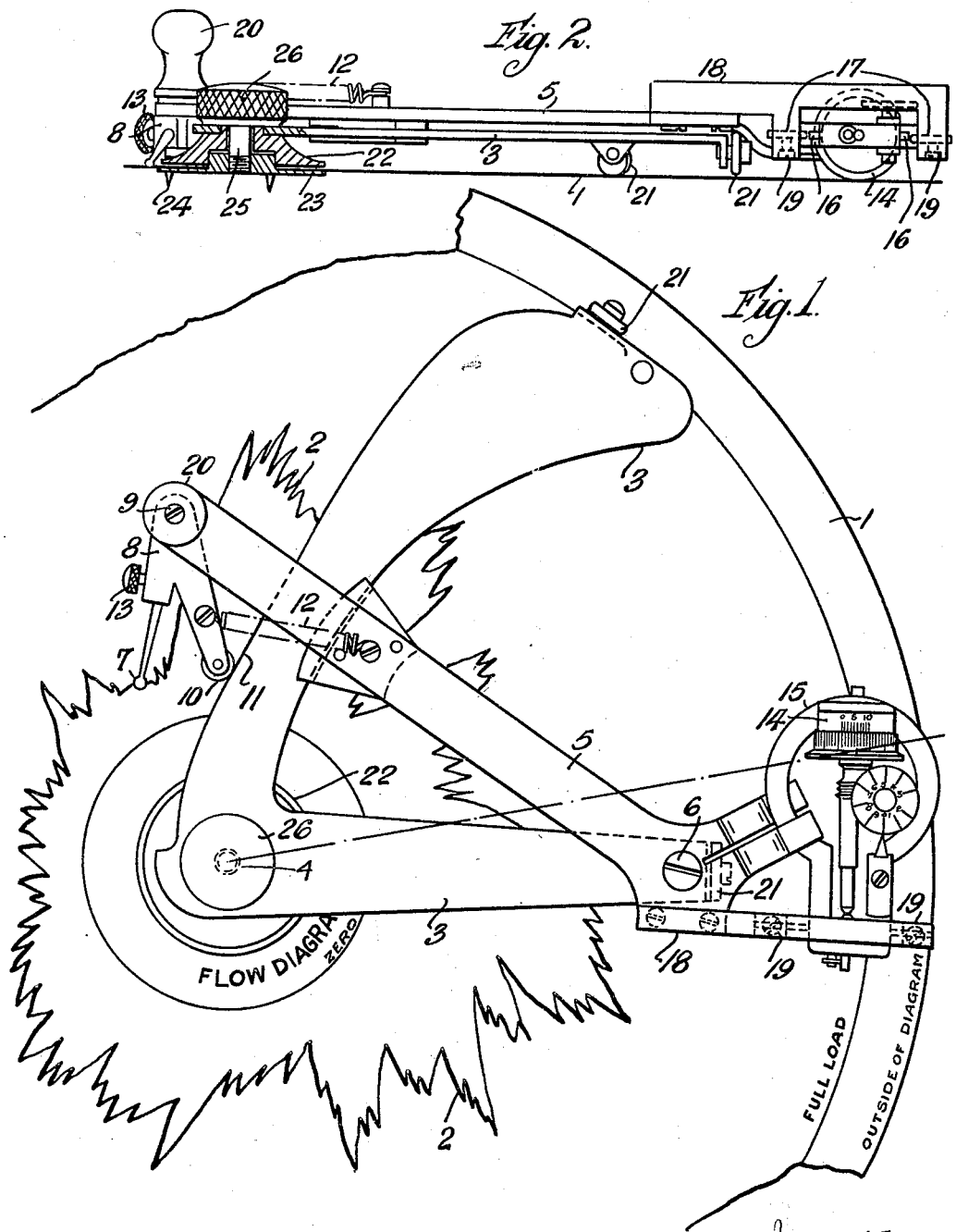

July 12, 1932.  H. E. DALL  1,867,441

PLANIMETER

Filed Nov. 1, 1930  3 Sheets-Sheet 2

Inventor
Horace E. Dall,
By his attorneys.
Baldwin Wight

Patented July 12, 1932

1,867,441

UNITED STATES PATENT OFFICE

HORACE EDWARD DALL, OF LUTON, ENGLAND, ASSIGNOR TO GEORGE KENT, LIMITED, OF LUTON, ENGLAND

PLANIMETER

Application filed November 1, 1930, Serial No. 492,825, and in Great Britain November 2, 1929.

This invention relates to a planimeter, which is particularly adapted for integrating the total quantity of fluid passed in a given time from diagrams on which a variable rate of flow of fluid is recorded continuously on a time basis, and on which the displacement of the recording pen from the zero flow line is proportional, or approximately proportional, to the square of the rate of flow.

The present invention provides simple means for rotating the plane of a planimeter wheel so that when a traverse is taken, its readings shall be proportional to the integrated product of the diagram co-ordinates. It is based on the fact that the arc of a circle may be made to intersect the co-ordinates of a diagram, such as that above described, so that the angles intercepted between successive ordinates are very nearly those required to give the correct registration on the planimeter wheel.

The planimeter wheel is attached to an arm which is so pivoted to the main frame of the apparatus that a given fixed point on it will intersect the ordinates of the diagram to be integrated in the manner stated above. As any chosen fixed point on the pivoted arm will usually not give the exact angular spacing required for correct integration by the planimeter wheel, the position of the tracing point which controls the position of the arm will, in general, require slight modification for each angular position that the arm may take up. This required slight modification of the angular position of the tracing point may be effected by means of a cam and roller device, or by any equivalent device, and, since the correction to the position of the tracing point is everywhere small, very little force is required to operate the device.

Further, since the device is only required to correct a position which is already very nearly correct, it does not require to be formed to an extremely high degree of accuracy.

The pivoted arm and the cam and roller device or equivalent device provide an extremely simple and easily made way of obtaining the required angular positions of the plane of the planimeter wheel.

If the movement of the main frame of the apparatus carrying the planimeter wheel arm as above described is in a direction parallel to the diagram abscissæ, and the tracing point is caused to follow the recorded trace of the diagram ordinates, the planimeter wheel will read the integrated product of the two ordinates. From this integrated product the total quantity of fluid passed in a given time can be ascertained.

Suitable adjustments are provided to enable the planimeter wheel to give the exact reading required for one complete traverse along a stated ordinate, and also to adjust for any error in the position of the zero ordinate, due to expansion of the diagram paper or otherwise.

A planimeter constructed according to the invention is applicable for use with diagrams having other co-ordinates than flow and time, and also to ordinate spacing other than those above described. It is suitable for rectangular, strip or disc diagrams.

Figure 4:
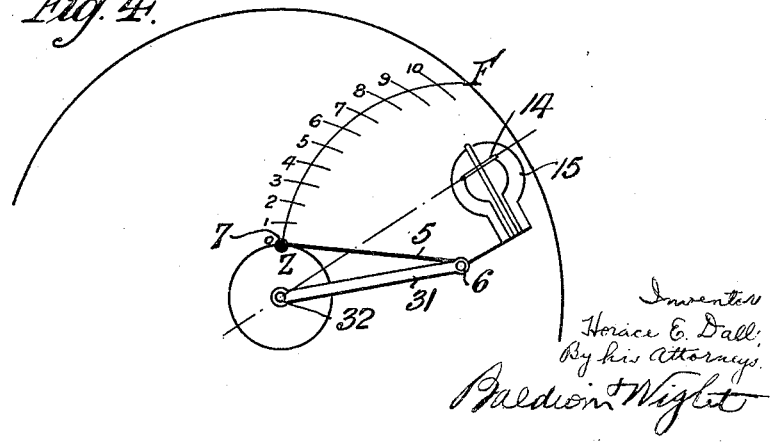
Figure 5:
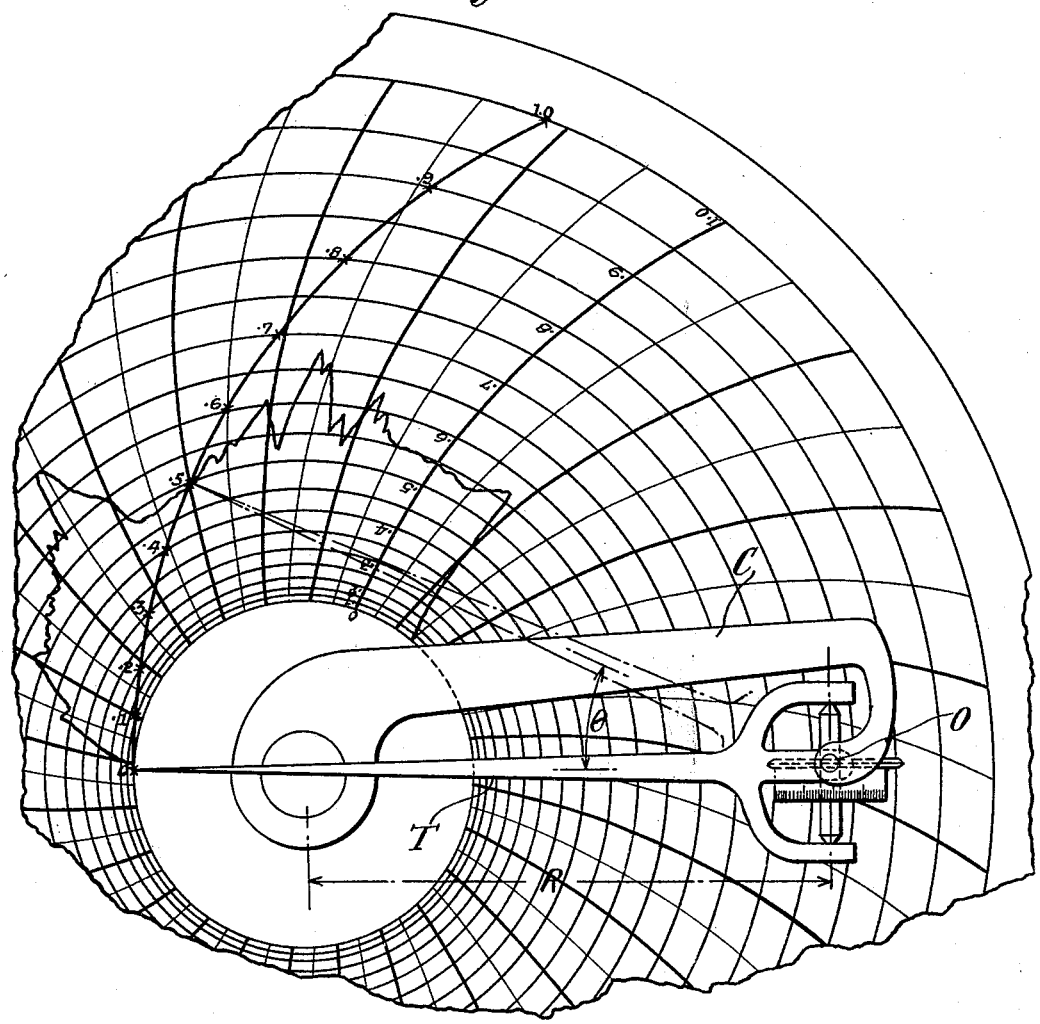

The invention is illustrated in the accompanying drawings in which Figure 1 is a plan and Figure 2 a sectional side elevation of one form of construction for use with a disc diagram and Figure 3 is a plan view of a modification for use with a strip diagram. Figure 4 is a diagrammatic view of a further modification. Figure 5 is a diagram illustrating the principle on which is based the construction of apparatus according to the invention.

Referring more particularly to Figures 1 and 2, 1 is the diagram to be integrated and 2 is the pen trace on the diagram. 3 is a planimeter traversing frame which is pivoted at 4 and to which an arm 5 is pivoted at 6. 7 is a tracing point which is carried by an arm 8 pivoted at 9 and having a roller 10 engaging a cam 11 formed on the frame 3, 12 being a spring which maintains the roller 10 in engagement with the cam. The tracing point 7 is locked in position by a screw 13 which allows the point to be moved inwards or outwards to or from the planimeter wheel 14 by slight amounts to allow for any error in position of the zero line owing to expansion of the paper or otherwise.

The planimeter wheel is mounted in a frame 15 having spindle portions 16 pivotally mounted on fulcrum pins 17 mounted parallel with the plane of the planimeter wheel in a frame 18 secured to the arm 5. In order to enable the axis of the planimeter wheel to be adjusted radially so that it may give an exact reading for one complete traverse along any stated ordinate, the pins 17 are adjustable in the frame 18 and are clamped in the desired position by screws 19.

20 is a knob by which the apparatus is traversed about the centre 4 and the tracing arm 5 is moved. 21 are rollers which support the frame 3.

The disc diagram 1 to be integrated is clamped between a washer 22 and a plate 23 which is fitted into a drawing board or other suitable support by means of spikes 24. The plate 23 is threaded for reception of a pin 25 having a knurled nut 26 on its outer end, the nut engaging the top of the frame 3.

In the arrangement shown in Figure 3, the frame 3 is provided at one side with rollers 27 running on a guide rail 28 parallel with the diagram abscissæ, and is supported at the other side by a roller 29, the arm 5 being pivoted at 30 to the frame 3.

Figure 4 illustrates the application of the invention to a diagram in which the flow lines are equally spaced between Z and F. In this case the arm 5 would be shortened so that the arc ZF would pass through the centre 32 instead of being almost tangential to the zero circle, as in Figure 1, the arm 5 being pivotally mounted on a link 31 which is pivotally mounted at 32.

Referring to Figure 5 which illustrates the principle governing the positioning of the arm 5 carrying the planimeter wheel 14 and the tracing point 7 for use with a circular diagram, the registration of the planimeter wheel per revolution of the carriage round the diagram will be proportional to $R . \sin \theta$, where R is the radius from the diagram centre to the contact point of the planimeter wheel, and $\beta$ is the angle which the plane of the planimeter wheel makes to a diagram radius passing through the contact point. In Figure 5 the simple case is shown in which the contact point of the planimeter wheel coincides with the pivoting point of the tracing pointer. In this case the angle from the zero position which the tracing pointer can take up is also equal to $\theta$ and the radius R remains constant. The arc traversed by the tracing pointer T in pivoting about the point O is shown to intersect successive lines representing equal flow increments on the diagram at the point marked thus, $x$, and the length R and the radius of the pointer arc are so chosen that $R . \sin \theta$ is approximately equal to KQ, where K is a numerical constant and Q is the rate of flow corresponding to the flow line which subtends an angle $\theta$ on the diagram, i. e. $R . \sin \theta$ will have a certain value when the point 7 is at the ordinate 2 and will have as nearly as possible twice that value when the point 7 is at the ordinate 4, three times that value when the point 7 is at the ordinate 6, and so on, the planimeter wheel lying along the radial line when the instrument is in its zero position. Thus, the registration of the planimeter wheel per revolution of the carriage C round the diagram will be proportional to Q.

Figure 5 shows the case of a diagram whose flow ordinates are divided on an approximately square root basis which is common for flow meters based on the differential pressure across orifices and the like, and the location of the intersecting arc as shown will give approximately correct registration. Since it is usually impossible to make $R . \sin \theta$ exactly proportional to the flow figures marked on the chart for all values of $\theta$, the cam according to the arrangements shown in Figures 1–3 is introduced in order to bring the approximate relation referred to, in accurate relation by modifying the angular displacement of the planimeter wheel. To assist in arriving at a closer approximation to the relation, the radius R to the contact point can be made to vary at different positions of the tracing pointer by arranging that the pivoting point of the tracing arm is displaced from the radius to the contact point of the planimeter wheel, as shown in Figure 1. Similarly, by modifying the length of the arm 5 and the position of the centre 6, other spacings than square root spacing or equal spacing could be dealt with.

What I claim is:—

1. In a planimeter for use in integrating a diagram, means for approximately producing the required angular displacement of the planimeter wheel for correct integration, comprising a movably mounted traversing frame, an arm pivoted to said traversing frame, a tracing point on said arm, a planimeter wheel carried by said arm, and means connected to said tracing point and cooperating with said frame as said arm is turned about its pivot to cause the angles between successive intersections of the tracing point and the diagram to be approximately those required for correct integration.

2. A planimeter according to claim 1 in which the traversing frame is pivotally mounted, and means mounting said planimeter wheel for substantially radial adjustment relative to the pivotal axis of the traversing frame.

3. In a planimeter for integrating a diagram, a traversing frame, an arm pivoted to said frame, a planimeter wheel on said arm, a tracing means carried by and movable relatively to said arm, and said frame having a cam surface engaged and followed by said tracing means.

4. In a planimeter for integrating a diagram, a traversing frame, an arm connected and movable relatively to said frame, a planimeter wheel carried by the arm, a tracing point, and means carrying the tracing point and coacting with the arm and frame to vary the radial position of the wheel during travel to render its readings proportional to the integrated product of the diaphragm coordinates.

5. In a planimeter for integrating a diagram, a traversing frame, an arm connected and movable relatively to said frame, a planimeter wheel carried by said arm, a tracing point movable with said arm, and means operatively connected to said tracing point and cooperating with said frame to modify the position of the tracing point for each angular position assumed by the arm.

6. In a planimeter for integrating a diagram, a traversing frame, an arm connected and movable relatively to said frame, a planimeter wheel carried by said arm, a tracing point movable with and relatively to said arm, and means operatively connected to said tracing point and having operative connection with said frame for varying the position of the arm in accordance with the position of the tracing point relative to the frame.

7. In a planimeter for integrating a diagram, a pivotally mounted traversing frame, an arm connected to and movable relatively to said frame, a planimeter wheel carried by said arm, said frame having a cam surface, and an arm movably carried by the first mentioned arm contacting with and adapted to follow said cam surface, and a tracing point carried by the second mentioned arm.

8. A planimeter according to claim 7 having a frame on the first mentioned arm on the opposite side of its axis to the second mentioned arm, and means mounting the planimeter for adjustment substantially radially with respect to the axis of the planimeter frame, and a spring urging contact of the second mentioned arm with said cam surface.

9. A planimeter according to claim 6 having means slidably mounting the traversing frame.

10. A planimeter according to claim 6 having means rotatably mounting the traversing frame, and means to secure the last mentioned means to a support.

11. In a planimeter for use in integrating a diagram, the combination of a planimeter wheel, a tracing point, an arm carrying the tracing point and the planimeter wheel, a traversing frame, and a pivotal connection between said arm and frame at a point which is so located that when the arm is turned about its pivotal mounting on the frame the angles between successive intersections of the tracing point and the diagram are approximately those required for correct integration of the diagram.

In testimony that I claim the foregoing as my invention, I have signed my name this 24th day of October, 1930.

HORACE EDWARD DALL.